April 30, 1968 — D. E. CONNOR ET AL — 3,380,412
BALK REMOVER FOR PLANTERS
Filed Oct. 22, 1965
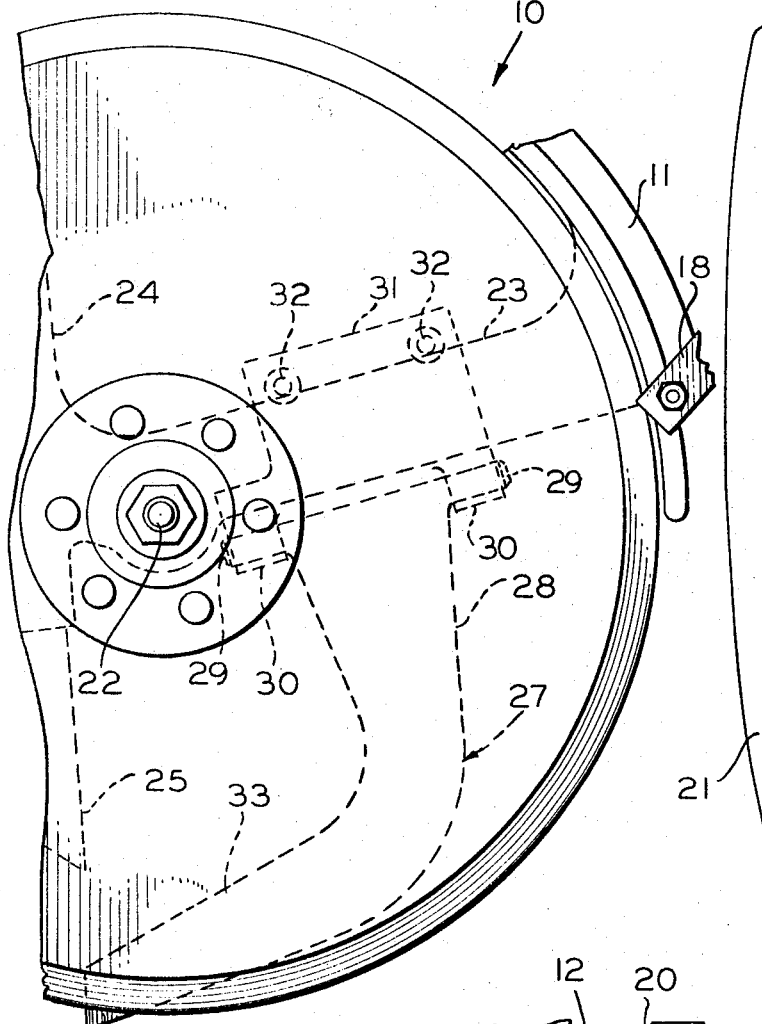
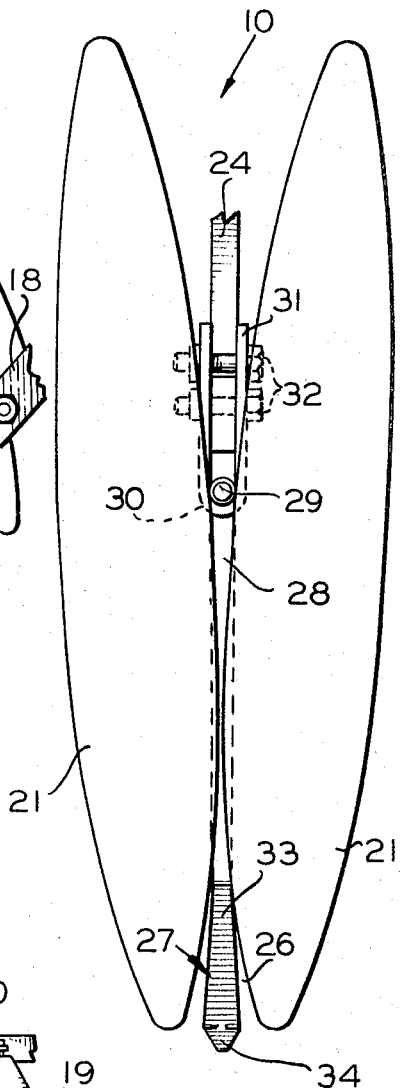
INVENTORS
DONALD E. CONNOR
DARLO E. LIENEMANN
ATTORNEY

United States Patent Office 3,380,412
Patented Apr. 30, 1968

3,380,412
BALK REMOVER FOR PLANTERS
Donald E. Connor, Plainfield, and Darlo E. Lienemann, Westmont, Ill., assignors to International Harvester Company, Chicago, Ill., a corporation of Delaware
Filed Oct. 22, 1965, Ser. No. 502,000
4 Claims. (Cl. 111—63)

ABSTRACT OF THE DISCLOSURE

In a double-disk furrow opener for planters and the like the disks converge forwardly and their earth-penetrating lower edges are spaced, forming a central ridge or balk which is leveled by the provision of a balk remover pivotally mounted on the disk support and extending downwardly between the disks into engagement with the balk in advance of the location at which the speed is dropped, the pivotal mounting of the balk remover allowing it to swing laterally between the disks.

---

This invention relates to agricultural implements and particularly to planters. More specifically, the invention concerns an improvement in furrow opening devices.

An object of the invention is the provision, in a furrow opener of the double disk type wherein a balk or mound of earth is formed between the disks by the passage thereof through the soil, of means for removing the balk prior to the deposition of seed or other material in the furrow.

Another object of the invention is the provision, in a planter having laterally spaced furrow forming elements arranged to leave a central mound or balk of earth in the furrow, of a balk removing member disposed between said elements in engagement with the balk and pivoted for lateral movement into substantial engagement with said elements.

A further object of the invention is the provision in a planter having laterally spaced furrow forming elements arranged to leave a central mound or balk of earth in the furrow, of a balk remover disposed between said elements in engagement with the balk and extending downwardly below the lower ends of said elements to form a central furrow below the level of the furrow formed by said elements.

Other objects and advantages of the invention will become clear from the following detailed description when read in conjunction with the accompanying drawings, wherein:

FIGURE 1 is a detail in side elevation of a portion of a double disk furrow opener incorporating the features of this invention;

FIGURE 2 is a diagrammatic end view, with parts removed, of the structure shown in FIGURE 1; and FIGURE 3 is a diagrammatic side elevation on a small scale of a planter unit embodying the features of this invention.

In the drawings the numeral 10 designates a double disk furrow opener unit mounted on a planter boot structure 11 forming part of a supporting frame 12 which also includes a support 13 for a seed hopper 14. The dispensing mechanism for the material in the hopper 14 forms no part of this invention as claimed, but it may be understood that drive is taken from a ground wheel 15 connected by a suitable sprocket and chain means contained in a housing 16. A pair of parallel links 17 and 18 connect the planter boot 11 to a bracket 19 mounted on a tool bar 20 which may be carried by a tractor or the like.

The furrow opener 10 comprises a pair of laterally spaced forwardly and downwardly converging disks 21, rotatably mounted on an axle 22 carried by a rib 23 extending between the disks and forming a part of the boot and hopper support 11, 13. Another rib 24 is tubular, providing a passageway for material from hopper 14 which is discharged into the furrow formed by the disks 21 through an extension 25.

The width of the furrow formed by the opener 10 is determined by the maximum width between the lower edges of the disks 21, and as shown in FIGURE 2, a generally triangular space 26 is provided between the area of convergence of the disks and the ground which, as the planter unit travels over the ground, results in the formation of a balk of earth generally in the shape of an inverted V in the center of the furrow. Seed or other material discharged through the outlet 25 goes down both sides of the balk and becomes widely separated. In order to confine the seed or the like to the center of the furrow, a balk remover 27 is provided between the disks to engage and level the balk prior to discharge of seed into the furrow. Balk remover 27, as indicated in FIGURE 1, is generally L-shaped, comprising an upper leg portion 28 provided with forwardly and rearwardly directed trunnions 29 for pivotal reception in spaced bight portions 30 of a U-shaped number 31 straddling rib 23 and secured thereto by the provision of bolts 32 at the upper ends thereof, member 31 being adjustable lengthwise of rib 23 to regulate the position of the balk remover.

The rearwardly and downwardly bent foot portion 33 of the balk remover 27 is laterally swingable within narrow limits by virtue of the trunnions or pivots 29 into substantial engagement with the lower inner edges of the disks 21 during operation to act as a scraper and prevent the accumulation of dirt on the inner edges of the disks, and the point 34 penetrates to a depth through the balk of earth below the depth of the furrow formed by the disks 21, the seed or other material from hopper 14 thus being deposited in the deeper furrow.

It is believed the construction and the operation of the novel planter mechanism of this invention will be clearly understood from the foregoing description. It should likewise be understood that the invention has been described in its preferred embodiment and that modifications may be made therein without departing from the spirit of the invention or the scope of the appended claims.

We claim:
1. In a material dispenser, a traveling supporting frame, a hopper mounted on the frame having therein material to be dispensed, a furrow opener mounted on the frame adapted to open a furrow in the ground to receive said material comprising, a pair of laterally spaced earth penetrating disks so disposed as to form therebetween a balk of earth projecting upwardly from the central portion of the furrow, means for discharging material from the hopper to the furrow, a balk removing member carried by the frame and having its lower end extending downwardly between the earth penetrating edges of said disks into engagement with the balk to remove the balk prior to deposition of said material in the furrow, and means pivotally mounting the balk removing member on the frame for lateral swinging of the lower portion thereof about an axis extending generally in the direction of travel.

2. The invention set forth in claim 1, wherein the lower end of said balk removing member extends below the lower edges of said disks to form a furrow deeper than that formed by said disks.

3. In a planter, a traveling supporting frame, a hopper mounted on the frame having therein material to be dispensed, a furrow opener mounted on the frame adapted to open a furrow in the ground to receive said material comprising, a pair of laterally spaced earth penetrating disks so disposed as to form therebetween a balk of earth projecting upwardly from the central portion of the furrow, means for discharging material from the hopper to the furrow, a balk removing member carried by the frame and having its lower end extending downwardly between the earth penetrating edges of said disks into engagement with the balk to remove the balk prior to deposition of said material in the furrow, the lower end of said balk removing member extending below the lower edges of said disks to form a furrow deeper than that formed by said disks, and means for pivotally mounting said balk removing member on the frame for lateral swinging of the lower portion thereof into substantial engagement with the inner faces of the disks to scrape dirt therefrom.

4. The invention set forth in claim 3, wherein said balk remover comprises a generally vertical depending leg portion pivotally connected to the frame and an angularly disposed rearwardly extending foot portion extending between the lower cutting edges of the disks.

References Cited

UNITED STATES PATENTS

| | | | |
|---|---|---|---|
| 860,416 | 7/1907 | Sparks | 111—22 |
| 2,656,801 | 10/1953 | Hansen et al. | |
| 3,117,540 | 1/1964 | Shader et al. | 111—34 |

FOREIGN PATENTS 840,628  6/1952  Germany.

ABRAHAM G. STONE, *Primary Examiner.*

R. C. HARRINGTON, *Assistant Examiner.*